(No Model.)
N. McLEAN.
SULKY CULTIVATOR.
No. 581,996. Patented May 4, 1897.
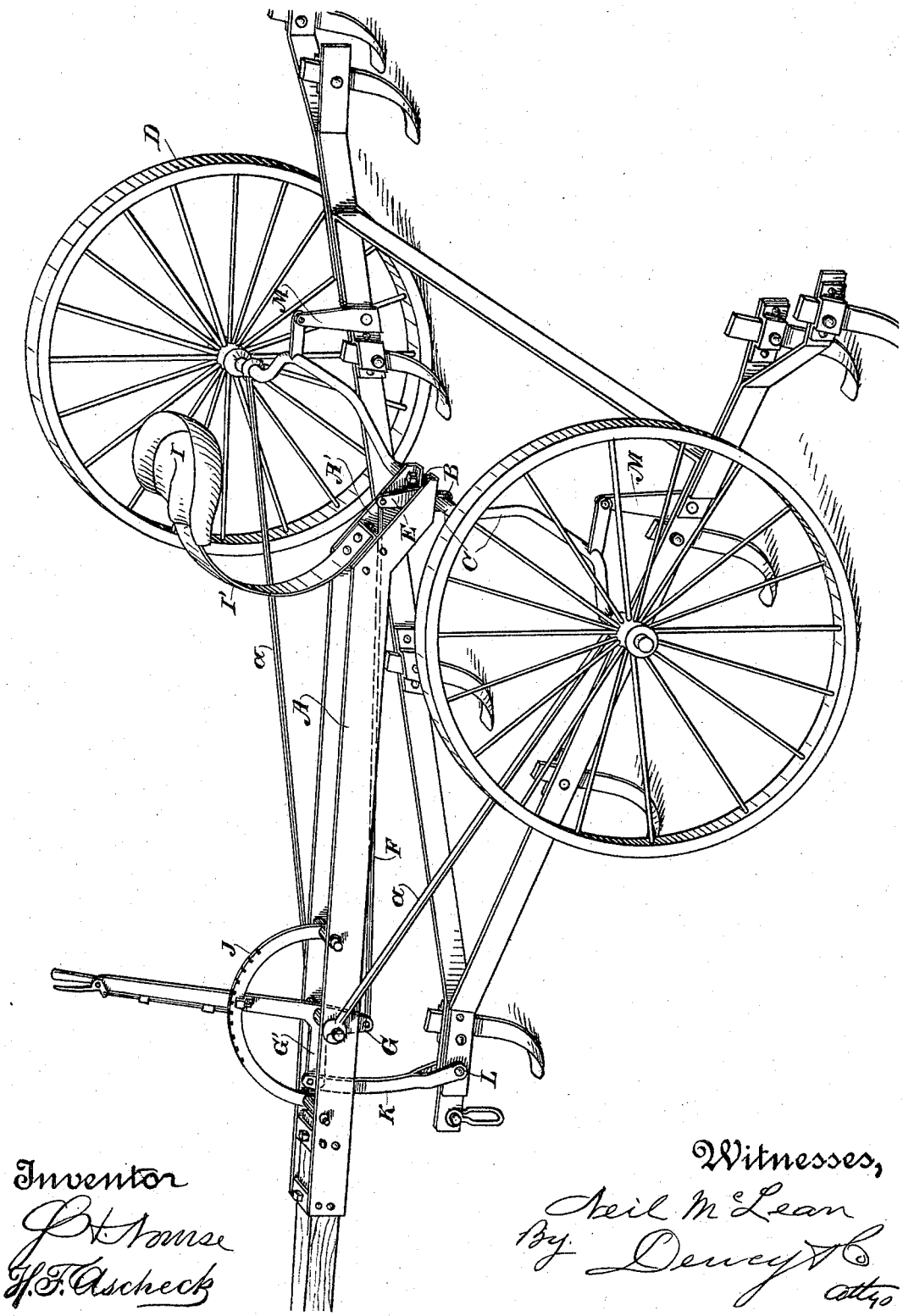
Inventor
Witnesses,

UNITED STATES PATENT OFFICE.

NEIL McLEAN, OF WATSONVILLE, CALIFORNIA.

SULKY-CULTIVATOR.

SPECIFICATION forming part of Letters Patent No. 581,996, dated May 4, 1897.

Application filed October 13, 1896. Serial No. 608,725. (No model.)

*To all whom it may concern:*

Be it known that I, NEIL MCLEAN, a citizen of the United States, residing at Watsonville, county of Santa Cruz, State of California, have invented an Improvement in Sulky-Cultivators; and I hereby declare the following to be a full, clear, and exact description of the same.

My invention relates to improvements in that class of apparatus for tilling the ground known as "sulky" plows or cultivators.

It consists in details of construction which will be more fully explained by reference to the accompanying drawing, in which the figure is a view of my cultivator.

A is the beam of my plow, which I have here shown constructed of plain or angle-iron plates suitably connected together so as to stand approximately parallel with each other and vertically on edge. The rear end of the frame is bent downward, as shown at A', and is provided with journal-boxes or clips B, through which the axle C passes and within which it is turnable. This axle is cranked upon each side of the point which supports the rear end of the beam, and its outer ends are brought back into line with this central portion. Upon the outer ends of this axle the wheels D are turnable loosely, so as to rotate independently of any movements of the axle. Braces *a* extend from the outer ends of the axle to the sides of the beam, near the front, and make the structure firm and rigid.

The pole to which the team is attached is fixed between the front portion of the beam-plates A, where it is secured by bolts passing through it and the plates.

From the center of the axle a lever-arm E projects upwardly between the beam-plates, and by means of a rod F it connects with the lower part of a lever G, which is fulcrumed between these plates. The upper end of the lever G has a handle within easy reach of the driver who may be seated upon the seat I, the support I' of which is secured to the beam, as shown. This lever has a pawl adapted to engage a holding-rack J, so that it may be moved to any desired point forward or back and retained in that position. An arm G' extends forward from its fulcrum-point, and a link or links K connect this arm with the front of the cultivator-frame proper. (Shown at L.) From the crank portions of the axle or shaft C arms project in the same direction sufficiently far to make a crank or lever of the desired length. It will be manifest that instead of these arms the axle itself may be bent to a sufficiently long crank. The outer ends of the arms or cranks are connected with the rear portion of the cultivator-frame by links M, so that when the cultivator-frame is to be lowered it is only necessary to throw the lever G forward, when the front end will be depressed by the action of the arm G' and the rear end in the same manner by the simultaneous movement of the connecting-rod F and the crank-arm E, which turns the axle C and depresses the crank-arms thereon, so as to lower the rear portion of the cultivator-frame simultaneously with the movement of the front portion. By this construction I avoid lifting the weight of the driver, since the rear portion of the beam is supported upon the central part of the axle, and this is in line with the portion upon which the wheels turn, so that the rotation of the axle by means of the lever G only turns the axle and its cranked portions so as to raise or depress the cultivator, while the rider's position is unchanged.

The double-plate formation of the beam makes it easy to construct, the rack being secured between the sides by means of a tube at each end, through which a holding-bolt passes and is secured and firmly clamped by a nut, and the lever is fulcrumed in the same manner by a tubular sleeve turning upon a bolt.

The seat bracket or spring has a flanged plate to which it is attached at the bottom, and the flanges of this plate are riveted between the side bars of the beam, thus securing the whole, making a rigid construction with but few joints to get loose or need attention.

The cultivator-frame is here shown as in the form of a triangle, having means for attaching cultivator-teeth thereto and extension-plates bolted onto the rear ends so as to extend outwardly behind and to a greater width than the space between the wheels, these extension portions having cultivator-teeth fixed to them, as shown.

Having thus described my invention, what I claim as new, and desire to secure by Letters Patent, is—

1. An improved sulky-cultivator comprising a wheel-axle having the outer ends and a central portion in the same axial line, wheels turnable upon the outer ends of said shaft, a beam having the rear end supported in journal-boxes upon a central portion of the axle, which is turnable therein, and crank-arms intermediate between the end and central portions, a lever fulcrumed to the front portion of the beam with a projecting arm, a cultivator-frame with links connecting the rear portion with the crank-arms of the wheel-shaft, and the front portion with the lever-arm whereby the movement of the lever raises and depresses the cultivator without moving the frame.

2. An improved sulky-cultivator comprising a wheel axle or shaft having its central and end portions in the same axial line, wheels journaled to turn loosely upon the outer ends, crank-arms intermediate between the ends and the central portion, with connections between them and a cultivator-frame suspended beneath, a beam having journals connecting it with the central portion of the axle whereby the latter is turnable about its connection with the beam, a seat supported upon the beam, a lever fulcrumed to the front portion having an arm projecting therefrom and links connecting said arm with the front portion of the cultivator-frame whereby the movement of the lever turns the wheel-axle and raises or lowers the cultivator without moving the beam and driver's seat.

3. An improved sulky-cultivator comprising a cranked wheel-axle with the ends upon which the wheels turn and the central portion, axially in line, a beam upon which the center of the axle is journaled and turnable, a draft-pole connected with the front end of the beam, a lever fulcrumed to the beam, a suspended cultivator-frame beneath, links connecting the cranked portions of the axle and the lever with the rear and front portions respectively, of the cultivator, an arm fixed to the central part of the axle, and a rod connecting it with the lever, whereby the movements of the lever and axle are made in unison, to raise or depress the cultivator.

4. In a sulky-cultivator of the kind described, a beam composed of parallel plates with the sides vertically disposed, and forming an intermediate space between which an actuating hand-lever and rack are fixed, and within which an arm from the wheel-axle and a rod connecting it with the lever, are disposed, clips or journal-boxes by which the beam is supported upon the axle and the latter allowed to rotate therein.

5. In a sulky-cultivator of the kind described, a beam composed of parallel plates with vertically-disposed sides, and forming an intermediate channel within which an arm from the central portion of a cranked axle projects, clips or journal-boxes by which the axle is turnably connected with the beam-plates, a hand-lever projecting into the channel and connected by a rod with the axle-arm, and brace-rods extending from the beam to the outer ends of the axle which ends are in line with the central portion and turnable with relation to the brace-rods.

In witness whereof I have hereunto set my hand.

NEIL McLEAN.

Witnesses:
S. H. NOURSE,
JESSIE C. BRODIE.